Patented Mar. 27, 1934

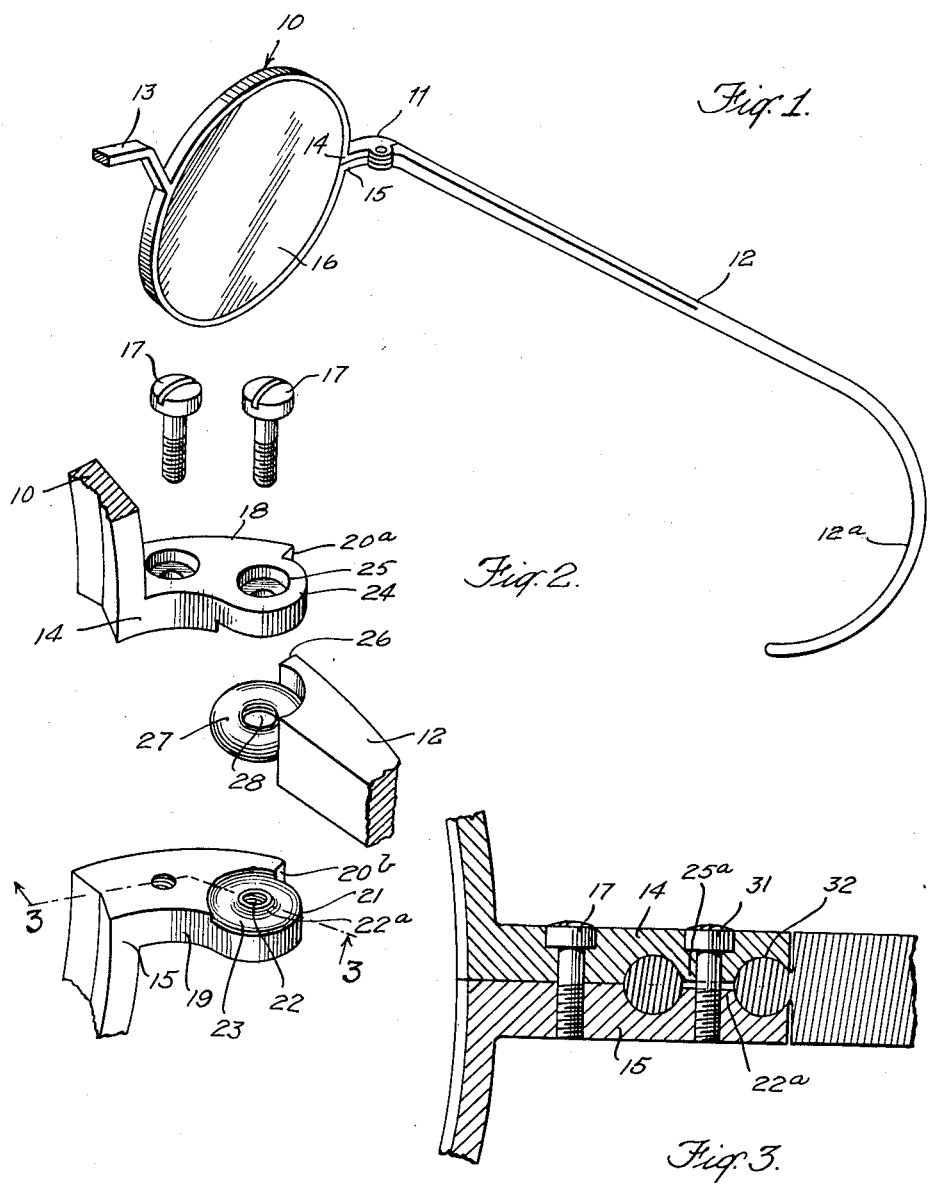

1,952,455

UNITED STATES PATENT OFFICE 1,952,455

EYEGLASS CONSTRUCTION

George E. Nerney, Attleboro, Mass., assignor to Bay State Optical Company, Attleboro, Mass., a corporation of Maine Application July 7, 1931, Serial No. 549,141

10 Claims. (Cl. 88—53)

This invention relates to eyeglass construction and more particularly to a construction for bearings in eyeglass construction adapted to create a maximum friction between the connected parts.

One of the objects of this invention is to provide in certain of the connected parts of an eyeglass frame, a construction which will be simple, durable and thoroughly practical. Another object of this invention is to provide a device of the above character of easy and economical manufacture and ready assembly while utilizing a minimum amount of labor. Another object of this invention is to provide a device of the above character which will be light, comfortable in use, and attractive in appearance. Another object of this invention is to provide a construction which will alleviate the difficulty of "drop temples" in a thoroughly successful and efficient manner. Another object of this invention is to provide a practical device of the above character having a pronounced frictional effect between certain of the connected parts thereof. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing in which is shown one of the various possible embodiments of this invention:

Figure 1 is a perspective of a portion of an eyeglass frame;

Figure 2 is an exploded perspective view of that portion of the frame shown in Figure 1 in the vicinity of the endpiece thereof, and Figure 3 is a cross-section taken along the line 3—3 of Figure 2, the parts here being shown as assembled.

Similar reference characters refer to similar parts throughout the several views of the drawing.

As conducive to a clearer understanding of certain features of this invention, it might here be pointed out that certain of the rotatably connected parts in eyeglass frames are more desirable and efficient in operation if considerable friction exists therebetween. For example, in the bearing connection between the temples and the frame or, more specifically, between the endpiece of the frame and the temple, a considerable amount of friction is of great advantage under certain circumstances. If this bearing is loose or free from friction, the annoyance of "drop temples" is inevitable. Thus, when the temples are in their open position or that position which is substantially at right angles to the general plane of the lenses and the frame is not in position upon the head of the wearer, temples having the common bearing connection are subject to the tendency of dropping down to their closed position upon the frame. The inconvenience of such an action is obvious as, for example, when the wearer is attempting to fit the glasses upon his head with one hand and thus cannot conveniently hold both temples in an open position. One of the various objects of this invention is to provide a construction which shall overcome these as well as many other difficulties.

Referring now to the drawing in detail, there is shown in Figure 1, a portion of an eyeglass frame having a rim 10, an endpiece 11 secured thereto, and a temple 12. Secured to rim 10 in any suitable manner is a bridge 13 which in turn is connected to the other rim of the frame (not illustrated). The other half of the frame is not shown in order to avoid encumbering the drawing unnecessarily, but it should be understood that the parts thereof are substantially identical to those shown. Rim 10 may take any convenient shape and preferably consists of a member split to have adjoining and abutting end portions 14 and 15. Thus, upon disassembly of rim 10 so that end portions 14 and 15 diverge from each other, a lens 16 may be inserted within the rim so that its edge preferably fits within an inwardly beveled inner surface thereof, as is more clearly shown in Figure 2. Upon connecting end portions 14 and 15, in a manner to be described hereinafter, lens 16 is firmly secured against any future displacement therefrom.

Turning now to Figure 2, there is shown a lug 18 extending laterally from end portion 14 of rim 10 and similarly a lug 19 extending laterally and connected to end portion 15 of the lens. Thus lugs 18 and 19 are adapted to abut against each other and are secured in this position by screw 17. For purposes of clarity, it should be understood that the term "rearward" signifies a direction substantially toward the ear engaging portion 12a of temple 12, the term "forward" being the opposite direction, while the term "outward" denotes a direction away from the head of the wearer and the term "inward" a direction substantially toward the face of the wearer.

Lugs 18 and 19 extend outwardly and rearwardly so that the remote ends thereof face the forward end of temple 12, while the outer ends of lugs 18 and 19 are cut inwardly to form shoulders 20a and 20b respectively, as most clearly shown in Figure 2. An ear 21, which is preferably an integral portion of lug 19, extends rearwardly, adjoining and beyond shoulder 20b, this ear being formed by swaging the remote end of the lug. A preferably threaded hole 22 extends through ear 21 and the surface of the ear is substantially concave and rounded to form a frusto-cone about hole 22, thus allowing for more threads in hole 22 as viewed in Figure 2. Thus an annular cavity 23 is formed about hole 22 in ear 21 and below the top surface of lug 19, the central or that portion 22a of the ear in the immediate vicinity of hole 22 substantially assuming the shape of a frusto-cone, as will be more fully described hereinafter. Similarly, the remote portion of lug 18 takes the form of an ear 24 extending rearwardly, adjoining and beyond shoulder 20a, this ear being formed by swaging the remote end of the lug. Thus, the under surface or that surface opposite ear 21 of ear 24 is substantially concave with respect to the bottom of a hole 25 to form an annular cavity 32 therein (Figure 3) substantially similar to cavity 23 in ear 21. In this manner, the top of hole 25 lies in a plane preferably slightly above the bottom surface of lug 18, as best shown in Figure 3, and together with annular cavity 32 it forms a frusto-cone-shaped portion 25a, the exact nature of which will be described hereinafter. It will now be seen that when lugs 18 and 19 abut, ears 21 and 24 are in substantial registry, having a recess therebetween, the surfaces of which are rounded in concave form on all sides and the two frusto-cone-shaped portions 22a and 25a lie opposite each other and in substantial registry.

The end of temple 12 forms a shoulder 26 adapted to lie in substantial registry with and abut against shoulders 20a and 20b. Extending forwardly and inwardly from and adjoining shoulder 26 is a tongue 27 preferably which may be formed by swaging the end of the temple on its upper and lower sides. A hole 28 extends through tongue 27 and all sides of the tongue are rounded in convex form so that the tongue preferably takes the form of a rounded eye secured to the inner end of temple 12. The surface of tongue 27 and cavities 23 and 32 of ears 21 and 24 are substantially similar in shape, although the tongue may have a larger diameter in cross-section than the total diameter of the cavities (Figure 3). The walls in the vicinity of the opposite sides of hole 28 are beveled in opposite directions and dimensions of this hole are slightly smaller than portions 22a and 25a of ears 21 and 24. Furthermore, the angles of these bevels in hole 28 and the angles of the walls of portions 22a and 25a are at or less than the critical frictional angle of the material from which these parts are to be formed. If, for example, the material is gold, the above-mentioned angles should preferably be so proportioned as to be less than the critical frictional angle of gold.

To assemble these parts after inserting the lens, temple 12 is so placed that tongue 27 is in engagement with cavity 23 in ear 21. Next, lug 18 is placed against endpiece 19 so that cavity 32 of ear 24 engages the top of tongue 27, and screw 17 is inserted in the endpiece to draw the respective parts in their closed position. As lugs 18 and 19 are drawn together, portions 22a and 25a are forced or wedge-fitted into hole 28 and, as an angle less than the critical frictional angle of these parts exists therebetween, portions 22a and 25a will exert a large pressure against the wall of the hole. Thus, a tremendous amount of friction is created between the respective parts. It will be seen that a bearing connection is thus formed between endpiece 11 and temple 12 which, in itself, has many thoroughly practical advantages, for the top of portion 22a in ear 21 and the bottom of portions 25a in ear 24 cannot abut, being below the engaging surfaces of lugs 18 and 19. Lugs 18 and 19 then may be closed against each other and portions 22a and 25a also serve in preventing any endwise motion of temple 12 from endpiece 11.

However, it is more desirable to have a reinforcing connection between the various parts to insure that portions 22a and 25a are firmly held in their wedging position within hole 28, as described above, and thus I provide a screw 31 passing through holes 25 and 28 and threaded into hole 22. As screw 31 is tightened to draw ears 24 and 21 toward each other, it will be seen that great pressure will be applied by the inner surfaces of these ears against the surface of tongue 27.

Furthermore, as pointed out above, the diameter or dimension of the recess is smaller than the diameter of tongue 27. Thus, the total pressure created by the tightening of screw 31 is applied to the surface of tongue 27, creating a large frictional surface between the respective parts and adding to the friction created by portions 22a and 25a within hole 28. Because of the fact that the connected parts are closely interfitted, the resultant connection formed therebetween is unusually strong and durable, so that it is free from damage from any cause as, for example, certain jars and twisting action incidental to the use of eyeglass frames. Also, because of the sound principle of construction employed in this endpiece, and especially the fact that it is founded upon a wedge between two parts, the engaging angles of which are less than the critical frictional angle thereof, the friction will remain to prevent or diminish the possibility of drop temples. Furthermore, it will be seen that by the provision of portions 22a and 25a, a greater length is given to the hole for screw 31, thus affording more room for threads. Also, no portion of screw 31 comes into contact with tongue 27, eliminating all binding action therebetween which might loosen the screw. The parts, due to their simple construction, may be easily swaged and/or struck from metal in any suitable manner, thus insuring cheap and ready manufacture.

It will thus be seen that I have provided a thoroughly practical and efficient construction in which the several objects hereinbefore referred to as well as many others are successfully and efficiently achieved.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, an endpiece having a slot therein and a hole extending therethrough, the surface of said slot being substantially concave in shape, a temple, an annular ring of substantially circular cross-section extending from an end of said temple and adapted to fit within said slot, and means adapted to pass through said first-mentioned hole and the hole in said ring to secure said ring within said slot.

2. In eyeglass construction, in combination, an endpiece having a raised portion at one end thereof, said portion being substantially in the shape of a frusto-cone, and a temple having an eye at one end thereof, the wall of the hole in said eye being substantially frusto-conical in shape and the smaller diameter thereof being slightly smaller than the smaller diameter of said raised portion and the angles of the wall of said cone and the wall of said raised portion being smaller than the critical frictional angle of the material from which these parts are formed.

3. In eyeglass construction, in combination, a member extending from and connected to the rim of an eyeglass frame, a second member extending from said rim parallel to and in registry with said first member, said members being undercut to form a slot therebetween at one end thereof, raised portions extending from each member substantially at the center of said slot, said portions having larger diameters at their bases than at their tops, a temple having an eye at one end thereof, the hole in said eye being smaller in diameter than the larger diameters of said raised portions, and means for securing said temple in said slot so that said raised portions are wedged within the hole of said eye.

4. In eyeglass construction, in combination, a member extending from and connected to the rim of an eyeglass frame, a second member extending from said rim parallel to and in registry with said first member, said members being undercut to form a slot therebetween at one end thereof, raised portions extending from each member substantially at the center of said slot, the surface of said slot being rounded and concave so that said raised portions are substantially frusto-conical in shape, a temple, an eye at one end of said temple, the surface of said eye being rounded and convex and the hole thereof being slightly smaller than said raised portions, and means for securing said eye within said slot so that said raised portions are wedged within the hole of said eye.

5. In eyeglass construction, in combination, a member extending from and connected to the rim of an eyeglass frame, a second member extending from said rim parallel to and in registry with said first member, said members being undercut to form a slot therebetween at one end thereof, raised portions extending from each member substantially at the center of said slot so that said raised portions are substantially frusto-conical in shape, a temple, an eye at one end of said temple, the wall of the hole thereof being beveled upon its opposite sides in opposite directions and slightly smaller than the larger diameters of said raised portions, the angles of the walls of said hole and the walls of said raised portions being smaller than the critical frictional angle of the material from which the parts are formed, and means for securing said eye within said slot so that said raised portions are wedged within said hole.

6. In eyeglass construction, in combination, an endpiece having a slot therein, the top and bottom of said slot being shaped into annular channels each substantially semi-circular in shape and having raised portions with tapered walls substantially at the center thereof, a temple, and a ring member substantially circular in cross-section secured to one end of said temple and fitting within said channels in said slot so that said portions are wedged within said ring member to retain said temple in said slot.

7. In eyeglass construction, in combination, an endpiece comprising two parts adapted to fit one upon the other, a slot formed at one end of said parts, one surface of said slot having an annular groove formed therein and a raised portion having tapered sides so that said groove is substantially semi-circular in cross section, a temple, an eye member secured to one end of said temple and having a rounded side, said eye member fitting within said slot and wedge fitted over said portion so that said rounded side fits within said groove, and means for holding said temple in said position, the angle of the tapered sides of said portion being less than the critical frictional angle of the material from which the parts are formed.

8. In eyeglass construction, in combination, an eye wire having two projections secured to its opposite ends, said projections forming an endpiece, the adjoining sides of said projections having undercut portions formed into annular grooves the centers of which are raised portions substantially frusto-conical in shape, said grooves being substantially semi-circular in cross-section, a temple, a ring-like tongue secured to one end of said temple and having a hole extending therethrough, said tongue being substantially circular in cross-section and fitting between said projections and into said grooves so that said frusto-conical portions extend into said hole to form a wedge fit therewith, and means for holding said temple in said position.

9. In eyeglass construction, in combination, an eye wire having two projections secured to its opposite ends, said projections forming an endpiece, the adjoining sides of said projections having undercut portions formed into annular grooves the centers of which are raised portions substantially frusto-conical in shape, said grooves being substantially semi-circular in cross-section, a temple, a ring-like tongue secured to one end of said temple and having a hole extending therethrough, said tongue being substantially circular in cross-section and fitting between said projections and into said grooves so that said frusto-conical portions extend into said hole to form a wedge fit therewith, and a screw extending through one of said projections, said hole and said tongue, and threaded into the other of said projections.

10. In eyeglass construction, in combination, an eye wire having two projections secured to its opposite ends, said projections forming an endpiece, the adjoining sides of said projections having undercut portions formed into annular grooves the centers of which are raised portions substantially frusto-conical in shape, said grooves being substantially semi-circular in cross-section, a temple, a ring-like tongue secured to one end of said temple and having a hole extending therethrough, said tongue being substantially circular in cross-section and fitting between said projections and into said grooves so that said frusto-conical portions extend into said hole to form a wedge fit therewith, the angles of the sides of said frusto-conical portions and the angle of the wall of said hole in said tongue being less than the critical angle of the material from which said projections and said temple are formed, and means for holding said temple in said position so that it may pivot about said frusto-conical portions as an axis.

GEORGE E. NERNEY.